Patented Dec. 14, 1937

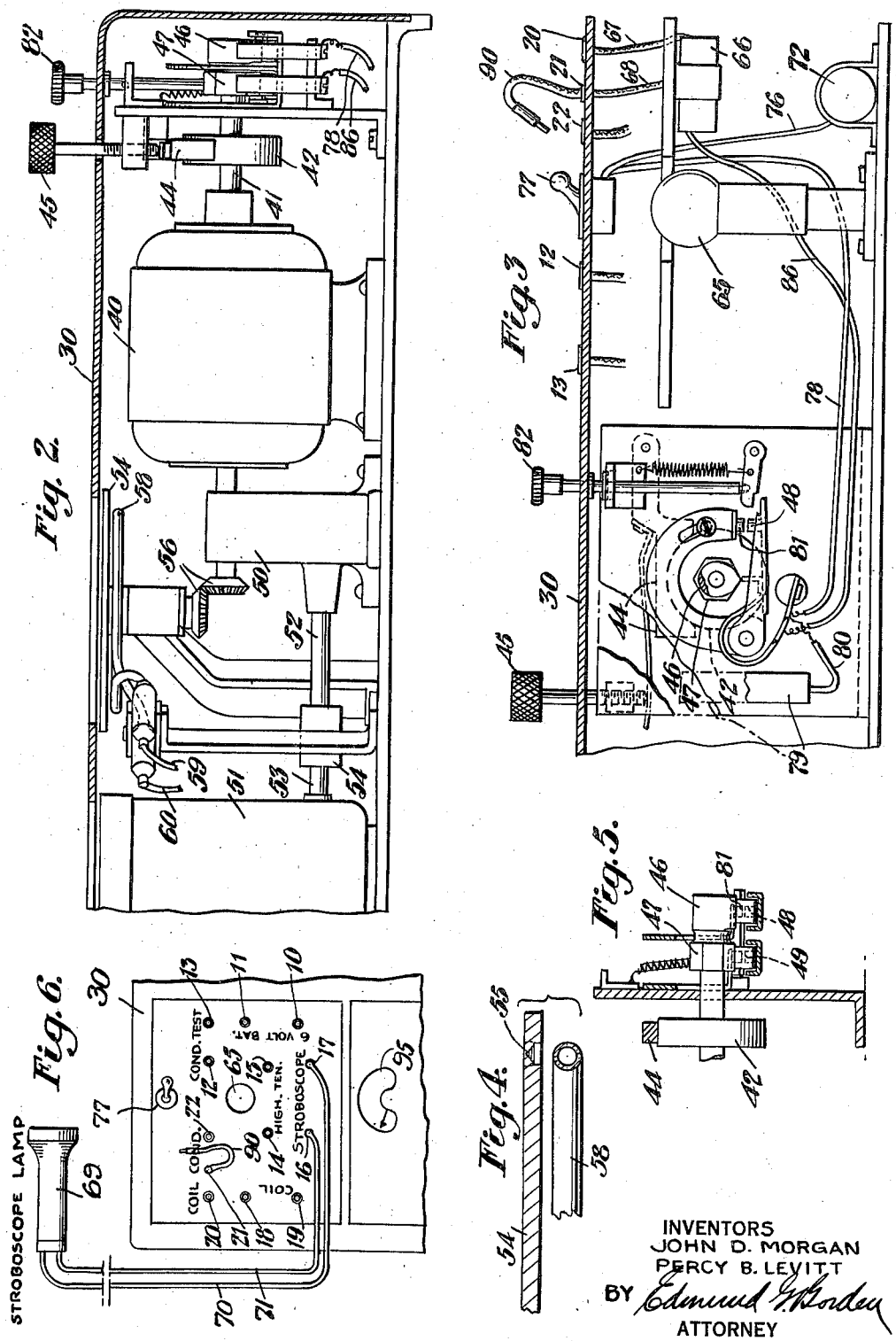

2,102,185

UNITED STATES PATENT OFFICE 2,102,185

APPARATUS FOR THE ANALYTICAL TESTING OF INTERNAL COMBUSTION ENGINES

John D. Morgan, South Orange, N. J., and Percy Bigmore Levitt, Bayside, N. Y., assignors to Powers Patents Company, Jersey City, N. J., a corporation of Maine Application September 6, 1935, Serial No. 39,366

3 Claims. (Cl. 175—183)

This invention relates to testing apparatus and more particularly to an improved apparatus for the analytical testing of internal combustion engines, their control equipment, electrical systems, etc.

One object of this invention is to provide an improved testing apparatus for analyzing the operation of an internal combustion engine. A further object is to provide a compact and easily handled testing equipment suitable for testing the component as well as the combined electrical equipment of an internal combustion engine. Yet further another object of the invention is to provide apparatus capable of stroboscopically analyzing the mechanical operation of the engine or its component parts. Other objects will be more particularly pointed out in the subjoined description, and include for example the determination of the speed of the engine.

In the drawings, like numerals represent corresponding parts of the various figures.

Fig. 2 is a side elevation partly in section on the line 2—2 of Fig. 1.

Fig. 3 is a partial end elevation on the line 3—3 of Fig. 1.

Fig. 4 is a detail view on the line 4—4 of Fig. 1.

Fig. 5 is an enlarged detail view of the timing contacts at the end of the motor shaft.

Fig. 6 is a partial plan view of the panel including the stroboscopic lamp.

Figure 1:
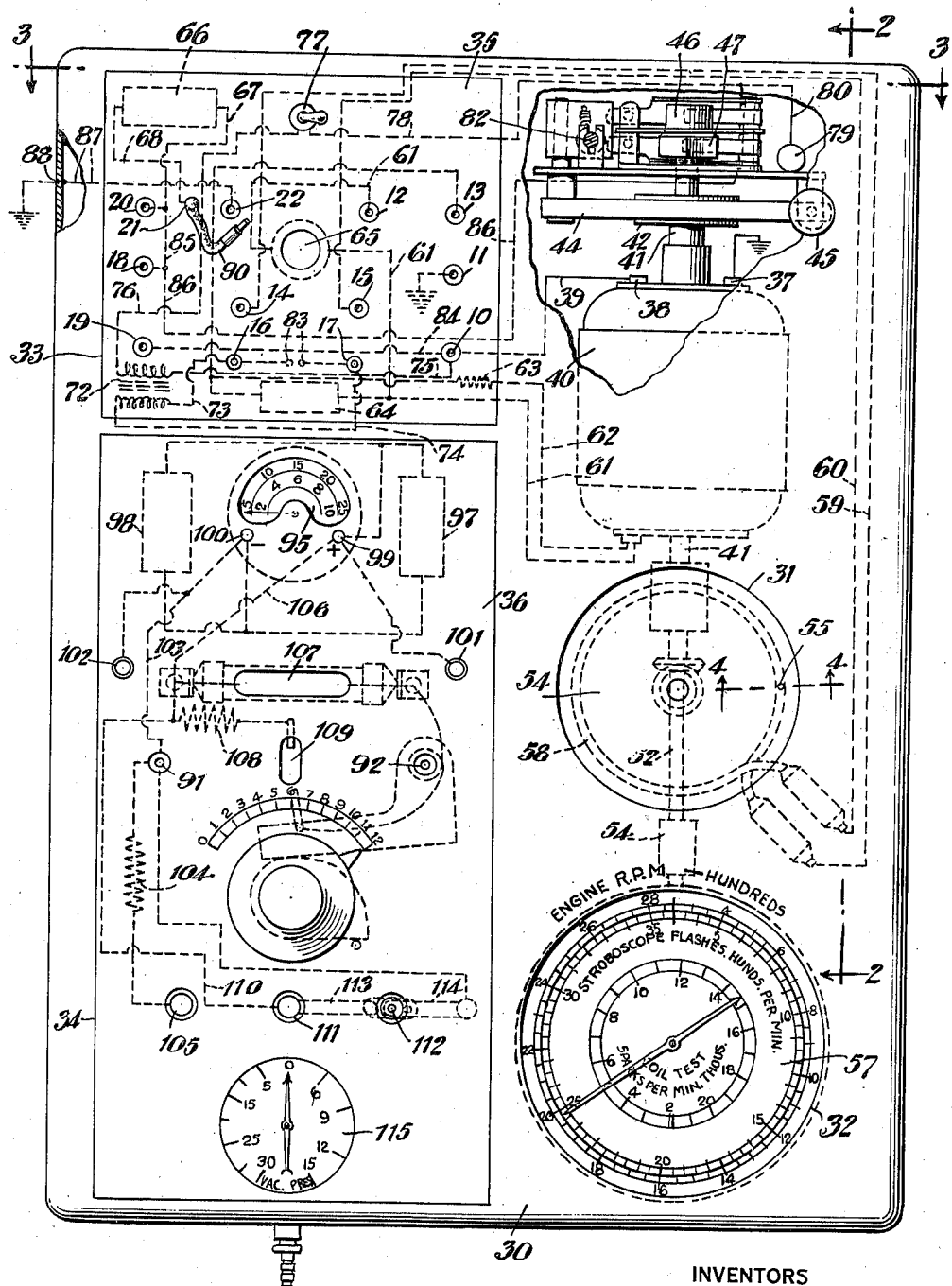
Fig. 1 is a top plan view of an apparatus some of the devices being illustrated schematically, and circuits by dotted lines.

Considering the drawings in greater detail, the apparatus is entirely housed in a compact casing providing suitable openings for access to certain of the parts; other openings for the visual inspection of meters; and still other openings containing panels to which connections may be made while analyzing the operation of devices being tested.

This apparatus comprises a housing 30 provided with several opeings, an opening 31 for the visual examination of a stroboscope, a second opening 32 for the examination of a tachometer operatively associated with the stroboscope device and openings 33 and 34 for panel boards 35 and 36.

The right hand half of the apparatus shown in Fig. 1 is utilized in substantially one way or another in most every test made with the equipment. This part of the apparatus comprises preferably a motor generator set 40 having a single stator winding and two or more rotor windings; one of the latter providing the motor winding and the other providing the generator winding. The windings are permanently connected to appropriate terminals on the panel board 35. The motor shaft extends into a gear housing 50, Fig. 2, and is operatively associated with a tachometer 51 by means of the coupling 54 and the shafts 52 and 53. The arrangement of the gear ratios and the indications on the tachometer dial 57 are such as to provide a direct reading scale corresponding to revolutions per minute of the engine; another scale corresponding to flashes of the stroboscope in hundredths per minute; and a further scale corresponding to the impulses applied to a coil under test and reading in thousandths of sparks per minute. By the use of this latter scale, it is readily apparent that the calibration of an ignition coil may be readily determined by dividing the reading of the dial in thousandths of sparks per minute by an appropriate factor depending upon the number of cylinders of the engine and the gear ratios.

The armature shaft 41 on the opposite side of the motor from the gear housing carries a brake disc 42 and a suitable hand operated Prony brake 44, the latter being controllable from the exterior of the housing by means of the hand wheel 45, Figs. 1 and 2. Two cams 46 and 47 are mounted on the shaft beyond the Prony brake and provide means for actuating speed impulse contacts 48 and 49 respectively.

The stroboscope comprises a rotary disc having a translucent spot thereon, together with a motor generator set for rotating the disc, a tachometer for recording the speed of the disc, and a neon lamp for imparting light flashes to the rotary disc to set up a comparison for synchronizing the speed of the disc with the speed of the part being measured. The disc indicated as 54, Figs. 1 and 2, is mounted on a vertical shaft which is geared by bevel gears 56 to the main drive shaft 41 of the motor generator 40. The disc 54 is substantially opaque having a hole 55 drilled part way through the disc to provide a translucent spot on the upper face of the disc. Immediately below the disc and aligned with the path of the rotation of the spot 55 is mounted a circular neon lamp 58 which has electrical connections 59 and 60 by which the spark discharge of the engine may be imparted to the lamp to give flashes in the lamp corresponding to the frequency of flashes of the spark plugs. The spark plug flashes usually indicate the speed of rotation of the main engine due to the fact that the engine makes one revolution for each discharge of the spark plug.

The conductors 59 and 60 connect between the terminals of the lamp 58 and terminals 14 and 15 respectively, on the panel board 35, these terminals being marked "high tension" in Fig. 6. With lead wires connecting between the terminals of the spark plug and the terminals 14 and 15, the engine of the car may be set into operation and then the speed of the motor generator set 40 gradually increased until the spot 55 becomes illuminated and appears to stand still. At the time that the spot stands still the tachometer may be read as indicating directly the speed of rotation of the engine. As the speed of the automotive engine is increased or decreased, the speed of the motor generator set must be increased or decreased by operation of the Prony brake through the hand-wheel 45 in order to bring the spot 55 into a stationary position. By this means the stroboscope may be used for measuring any speed of the engine. When the automotive engine is running at low speed it may be more convenient to operate the stroboscope motor generator set at a high speed to get more accurate determinations. At this time the stroboscope may be actually operating at two or four times the speed of the automotive engine at the time when the point 55 stands idle. By gradually changing the speed of the motor generator set the harmonic speeds of the motor generator set may be adjusted to bring the spot 55 to a stationary position and the tachometer speed observed. At such time the actual speed of rotation of the engine would be obtained by dividing the tachometer indication by two or four in accordance with the speed of the tachometer.

With the stroboscope speed indicator other tests may be made with reference to automotive parts. For example, the stroboscope may be used for setting the governor speed. It may be used for checking the automatic and spark advance mechanism at different speeds. It may be used for determining the speeds when checking the generator voltage and oil pressure. It may be used for synchronizing a plurality of carburetors and particularly, on V-type engines. It may be used for determining the speed while the apparatus is used for checking the coil output, thus determining the coil output for different speeds. It may be used for determining the speed of the automotive engine when the coil breaks down. It may be used for determining the engine speeds in determining the fuel consumption at different speeds.

The motor end of the motor generator 40 is arranged to be driven by the customary six-volt battery of an automobile ignition system. However, twelve-volt batteries can be utilized. An adaptor is necessary in such cases. The terminal 37 on the motor side is connected to ground and the terminal 38 is connected by the conductor 39 to the terminal 10 of the panel board, Fig. 1. The battery is arranged to be connected between terminals 10 and 11 on the panel board and when so connected it is apparent that the motor part of the motor generator set will be driven at appropriate speed because of its connection directly across the battery. For the purpose of varying the speed of the motor the Prony brake is utilized, the speed being reduced by means of the brake.

The generator end is connected by conductors 61 and 62 respectively to terminals 12 and 13 of the panel board, these terminals being marked "Condenser test" in Fig. 6. To limit current and for the added purpose of removing the effect of harmonic current upon the neon lamps these connections include a filter circuit. A relatively high resistance 63 is placed in circuit 62 and a filter condenser 64 is connected between the conductors 61 and 62. Conductor 61 continues through the neon lamp 65, or any gaseous discharge type of lamp, to the terminal 12.

Condensers may be tested by connecting them with wire conductors across the terminals 12 and 13. If the condenser is in good condition, one flash on the neon lamp 65 will occur. This corresponds to the initial charging impulse on the condenser from the generator. If the condenser is of poor quality, leakage will occur and the lamp will continue to flash at periodic intervals depending upon the particular constants of the circuit and the condenser. If the flashes are frequent and close together the condenser is obviously in very bad condition and should be replaced.

A standard condenser 66, Figs. 1 and 3, is connected to the terminal board across terminals 20 and 21 by means of conductors 67 and 68. This standard condenser is normally utilized in testing coils. If it should be desired to test the condenser itself the terminal 20 may be connected by a conductor or plug jack across to the terminal 12, and terminal 21 may be connected to terminal 13 by conductor 90 and this condenser tested in the same manner as previously described.

For the purpose of analyzing the actions of mechanical parts such as valves, valve springs, timing shafts, etc., a stroboscopic lamp 69 is provided with flexible leads 70 and 71 so that it may be plugged into the terminals 16 and 17 marked "Stroboscope" in Fig. 6. This stroboscope lamp is an appropriate type, one form being the neon lamp. This lamp is provided with power by suitable connections in the testing apparatus to terminals 16 and 17. The terminals are connected directly across the high tension side of a transformer 72 by means of conductors 73 and 74 and a spark gap 83 protects the insulation against excessive voltage if the lamp is not plugged in. The low side of the transformer is connected by a lead 75 directly to terminal 10, being the positive side of the battery. The other terminal of the transformer is, by means of conductor 76, connected to the hand-operated switch 77. This switch is located at the top of the panel as viewed in Fig. 6. A conductor 78 from the switch 77 extends over to a single lobe timing contact 48, and a condenser 79 is connected on one side to ground and the other side by a lead 80 to the conductor 78, Fig. 3. Terminal 81 of contact 48, Figs. 3 and 5, is likewise grounded to the apparatus. The operation therefore is as follows: A battery having been connected across terminals 10 and 11, the motor generator is placed in operation. A lock-out mechanism 82 is then released and the timing contacts allowed to be opened and closed by the cam 46 which is secured to the shaft in the motor. The stroboscopic lamp is plugged into the terminals 16 and 17 and switch 77 is closed. This causes periodic impulses of direct current to be impressed upon the transformer 72, thereby effecting high tension impulses upon the secondary of the transformer, and thence across the terminals 16 and 17 and stroboscopic lamp 69. The speed of the motor 40 may be adjusted by the Prony brake so that the lamp flashes in synchronism with the speed of the part being tested. In this manner the valve or valve spring, time shaft or other part of the apparatus may be made to appear stationary while under observation by the person conducting the test, and in this manner the normal movement of the parts may be eliminated so that any irregular action due to the rebound in the valve or improper spring characteristics, etc., may be readily determined. The lamp may also be utilized to analyze the spring characteristics of the distributor so that if the spring is too weak and a flutter is occurring this can be readily observed and the spring replaced to eliminate this difficulty.

With the present invention car ignition coils may be tested while the internal combustion engine is in operation or while the coil is not connected in the ignition circuit of the internal combustion engine. If the coil is tested while the car is in operation the stroboscopic speed indicator may be used for indicating the speed of the engine and an interrupter is used to synchronize the current interruptions with the engine speed. The interrupter is used in the primary circuit of the ignition coil and when the primary circuit is loaded by means of the interrupter, the characteristics of the second circuit of the coil are measured with an indicating meter of the d'Arsonval type which is graduated empirically to denote the voltage and current characteristics of the secondary circuit.

To this end terminals 18 and 19 of Fig. 1 and marked "Coil" in Fig. 6 are used for the purpose of testing ignition coils. Terminal 19 is directly connected by conductor 84 to the battery terminal 10 and terminal 18 is connected by conductor 85 to terminal 20 and by conductor 86, Figs. 1 and 3, to a timing contact 49 operated by the multiple lobe cam 47. Terminal 22 of the panel board is connected to the case 30 and ground by conductor 87 at the point 88 of Fig. 1.

If it is desired to test a coil it is placed across terminals 18 and 19. A plurality of impulses corresponding to the speed of the internal combustion engine while in operation may be obtained by adjusting the speed of the motor 40. The impulses from the contact 49 will be varied proportionately, and these impulses may be impressed upon the primary side of the coil. The coil may be tested in conjunction with the standard condenser 66 by plugging the lead 90 into terminal 22. If it should be desired to test the coil with its own condenser, the plug 90 is taken out of terminal 22, and the condenser is connected across terminals 20 and 22, thereby replacing the standard condenser.

When it is desired to make load tests and determine the load characteristics of an ignition coil, one side of the coil is connected to terminals 18 and 19 and the secondary is connected in series to terminals 91 and 92 on the lower panel 36. This latter panel contains electrical testing apparatus described and claimed in a copending application Serial No. 759,835 owned by applicant's assignee. This apparatus comprises a d'Arsonval type meter 95, Fig. 1, arranged so that it may be utilized as either an ammeter or voltmeter. Condensers 97 and 98 are connected in a shunt connection across the terminals 99 and 100. These meter terminals are also connected to panel terminals 101 and 102. A 300-ampere or higher shunt ammeter may be connected across these terminals for reading of high currents. Terminal 100 is also directly connected to terminal 91 by conductor 103, and the latter terminal is connected through a high resistance 104 to a terminal 105. The other terminal 99 of the meter is connected by a complex circuit to terminal 92. This circuit contains a lead 106 connected with a neon tube 107 in parallel with a resistance 108 and an adjustable spark gap 109. The lead wire 106 is also connected by a conductor 110 to a terminal 111 on panel 36. With the secondary of the coil connected to the terminals 91 and 92 these connections permit the meter 95 to be placed in series with the spark gap 109 across the coil. In this way the load properties of the coil can be determined. Also it is possible to determine whether sufficient current is being delivered by the coil. If the other parts of the apparatus have not been tested it may be possible to locate a weak element in the system other than the coil itself. With the coil terminals plugged into the terminals 111 and 112 the meter may be utilized as an ammeter. Upon the insertion of a terminal plug in the pin jack 112, shunts 113 and 114 are automatically connected into the circuit of meter 95. If it is desired to test the voltage on the primary side of the coil, terminals 18 and 19 may be connected by lead wires to terminals 105 and 111 and the voltage across the coil observed from the meter 95.

Although a few of the tests which may be performed upon this apparatus have been described, it will be readily apparent to those skilled in the art that the apparatus is susceptible of many other uses which have not been described in detail. For example, other tests may determine the breakdown speed of an ignition coil, automatic spark advance at different speeds, oil pressure, generator charging and coil output at various speeds, polarity, continuity and comparison tests of coils; coils may be tested with car condensers, standard condensers, etc. Condensers may be tested on or off the car, leaky wires, sticky valves, flutter in the magneto points, flutter of valve springs and tappets, alignment of shafts and numerous other tests may be conducted with the apparatus as described, by merely changing the terminal connections on the panel boards to the equipment being tested. A vacuum and pressure gauge 115 is also provided on the testing apparatus for determining vacuum on the intake manifold and to synchronize the operation of a plurality of carbureters. The fuel pump pressure may also be determined.

Although the preferred embodiment of the apparatus has been described, it will be equally apparent to those skilled in the art that modifications within the true spirit and scope of the same are aimed to be covered in the hereto appended claims.

Having thus described the invention, what is claimed as new is:

1. A testing apparatus for analyzing the operation of internal combustion engine parts comprising a disc having a translucent peripheral portion, an electric lamp disposed adjacent the periphery of said disc so that its illumination may be observed through the translucent portion of said disc, motor means for causing a relative movement between the disc and lamp, electrical means connecting said lamp to the engine in such a manner that it is periodically energized in accordance with the speed of the engine, dial means operatively associated with said first named means for indicating the rate of relative movement between said disc and lamp, and a second lamp arranged to be periodically energized by impulses in accordance with the speed of said motor means, and provided with flexible leads whereby the lamp may be utilized to stroboscopically analyze the action of the component parts of the combustion engine.

2. A testing apparatus for analyzing internal combustion engine operations, comprising an enclosing housing, a motor-generator mounted in said housing, a plurality of relatively movable make and break contacts, cams having different predetermined numbers of lobes driven by said motor for operating said contacts, means to releasably maintain the contacts out of engagement with the cams; brake means to vary the speed of the motor-generator set; a disc having a translucent peripheral portion driven by said motor; an electric lamp disposed adjacent the periphery of said disc; and a dial means operatively associated with said disc and motor for indicating the rate of relative movement between the disc and lamp and said housing arranged to provide for visual examination of the dial means and disc.

3. A testing apparatus for analyzing internal combustion engine operations, comprising a motor-generator set, a source of power for operating the motor set, a panel board, terminals on the board connected with said source of power and connections between said terminals and said motor set, a high tension transformer connected with said source of power, an interrupter mounted on said motor set connected in said transformer circuit, a gaseous discharge lamp connected in said high tension circuit, means for controlling the speed of the motor, and a tachometer for indicating the speed of the motor.

JOHN D. MORGAN.
PERCY BIGMORE LEVITT.